(12) United States Patent
Haggard (10) Patent No.: US 7,300,272 B1
(45) Date of Patent: Nov. 27, 2007

(54) FIBER EXTRUSION PACK INCLUDING SPLIT DISTRIBUTION PLATES

(75) Inventor: Jeffrey S. Haggard, Cocoa, FL (US)

(73) Assignee: Hills, Inc., West Melbourne, FL (US)

( * ) Notice: Subject to any disclaimer, the term of this patent is extended or adjusted under 35 U.S.C. 154(b) by 473 days.

(21) Appl. No.: 10/762,472

(22) Filed: Jan. 23, 2004

Related U.S. Application Data (60) Provisional application No. 60/441,777, filed on Jan. 23, 2003.

(51) Int. Cl.
*B29C 47/30* (2006.01)

(52) U.S. Cl. .................. 425/192 S; 425/72.2; 425/464

(58) Field of Classification Search ............... 425/72.2, 425/464, 192 S, 382.2
See application file for complete search history.

(56) References Cited

U.S. PATENT DOCUMENTS 4,414,276 A * 11/1983 Kiriyama et al. ........... 428/374
5,344,297 A * 9/1994 Hills ........................ 425/131.5

* cited by examiner

*Primary Examiner*—James P. Mackey
*Assistant Examiner*—Dimple Bodawala
(74) *Attorney, Agent, or Firm*—Edell, Shapiro & Finnan, LLC (57) ABSTRACT

A fiber extrusion pack for extruding molten material to form an array of fibers includes a number of split distribution plates arranged in a stack such that each split distribution plate forms a layer within the fiber extrusion pack, and features on the split distribution plates form a distribution network that delivers the molten material to orifices in the fiber extrusion pack. Each of the split distribution plates includes a set of plate segments with a gap disposed between adjacent plate segments. Adjacent edges of the plate segments are shaped to form reservoirs along the gap, and sealing plugs are disposed in the reservoirs to prevent the molten material from leaking from the gaps. The sealing plugs can be formed by the molten material that leaks into the gap and collects and solidifies in the reservoirs or by placing a plugging material in the reservoirs at pack assembly.

39 Claims, 6 Drawing Sheets

FIBER EXTRUSION PACK INCLUDING SPLIT DISTRIBUTION PLATES

CROSS REFERENCE TO RELATED APPLICATION

This application claims priority from U.S. Provisional Patent Application Ser. No. 60/441,777, entitled "Fiber Extrusion Pack Split Distribution Plates," filed Jan. 23, 2003. The disclosure of this provisional patent application is incorporated herein by reference in its entirety.

BACKGROUND OF THE INVENTION

1. Field of the Invention

The present invention relates to synthetic fiber extrusion packs and polymer distribution plates for fiber extrusion packs.

2. Description of the Related Art

Fabrics made from melt-spinnable polymers are commonly produced using spunbond processes. The term spunbond refers to a process of forming a non-woven fabric or web from an array of thin, melt-spun polymeric fibers or filaments produced by extruding molten polymer from orifices. In a typical, large production spunbond machine, polymer pellets placed in a hopper are fed to a screw extruder which melts the polymer. The molten polymer then flows through a heated pipe to a spin beam. The spin beam is essentially a pressure vessel which uses boiling Dowtherm or a similar liquid/vapor material to provide uniform heat to a spin pack contained therein. The spin beam also contains one or more metering pumps which receive the molten polymer and control the polymer flow rate through the spin pack.

The spin pack can be constructed from a series of thin flat, generally rectangular plates into which small channels and holes are etched or machined. When layered in a stack and bolted together to form the spin pack, the plates form a distribution network for distributing the molten polymer to the spinneret at the lowermost portion of the spin pack. Such a distribution network is generally required only where bi-component or multi-component fibers are to be produced. Consequently, it will be appreciated that spunbond packs with multiple plates that form distribution networks as described herein, generally have applicability in the formation of plural-component fibers.

The spinneret contains an array of spinning orifices, typically from 1000 to 5000 per meter of length of the spinneret, arranged in a substantially horizontal, rectangular array, with each orifice extruding an individual polymer stream and being shaped to form fibers of a particular cross section and size. Below the spinneret, the array of extruded polymer streams forms a vertically oriented curtain of downwardly moving strands that are drawn as they cool and then further processed to form fabric (e.g., additional in-line processing can be performed to produce a non-woven web or fabric, or the fibers can be wound on a roll for later processing).

Figures 1, 2:
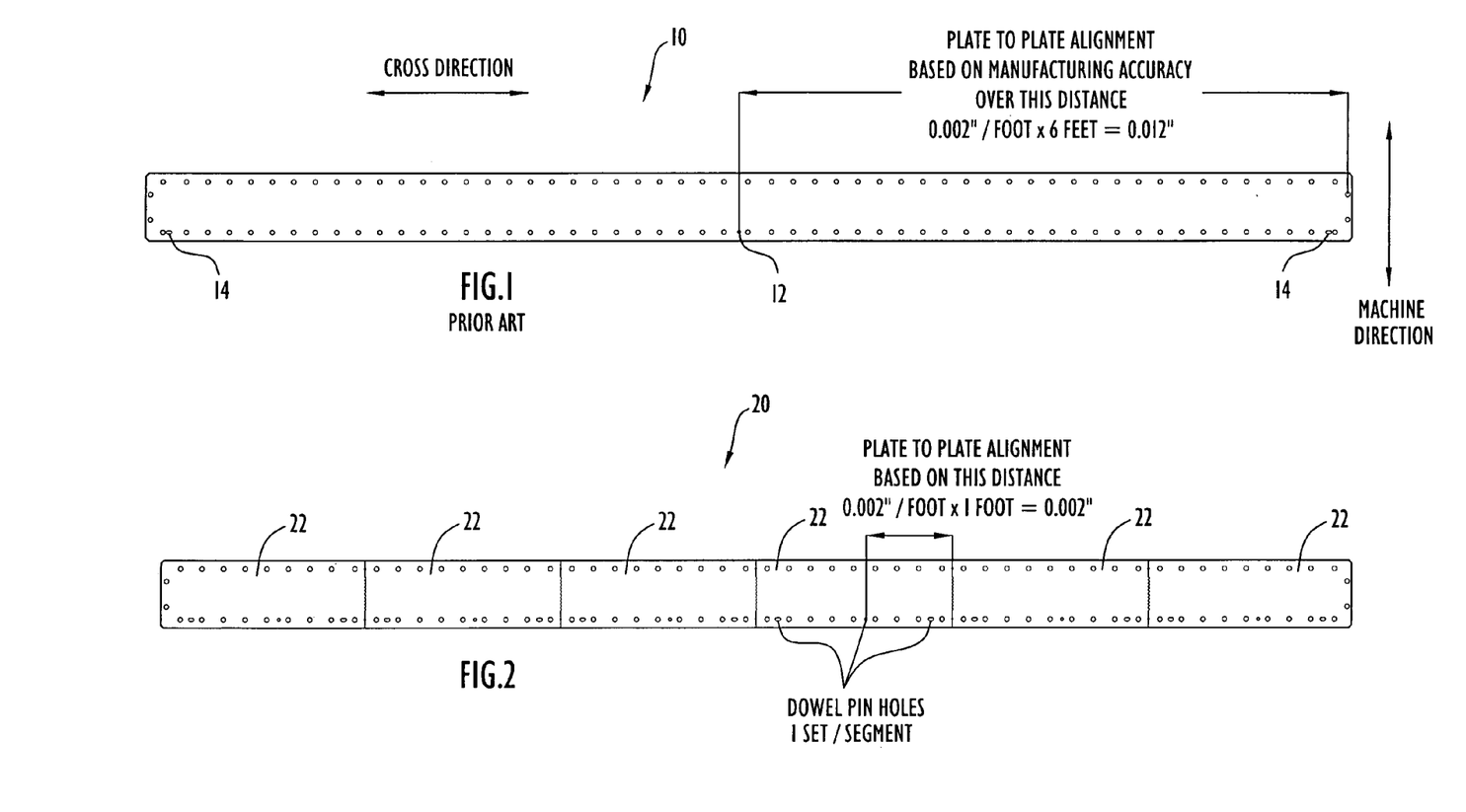
FIG. 1 is a schematic illustration, in plan view, of a conventional single-piece distribution plate used in constructing a fiber extrusion spin pack.
FIG. 2 is a schematic illustration, in plan view, of a split, multi-piece distribution plate comprising a plurality of side-by-side plate segments for constructing a fiber extrusion spin pack having improved plate-to-plate alignment accuracy.

A plan view of a representative distribution plate 10 of a conventional spunbond pack is shown in FIG. 1. For convenience, the polymer distribution features that would be present on such a plate are omitted from the drawing. Further, the slots and holes shown in FIG. 1 are not necessarily drawn to scale. In the example shown, plate 10 is approximately twelve feet in length in the cross direction. This dimension essentially dictates the maximum width of the extruded fiber curtain that can be produced and the corresponding maximum width of a non-woven web formed by laying the extruded fibers on a moving belt. In the machine direction, such plates are typically about eight to ten inches wide, although plates as wide as about sixteen inches have been used.

The spunbond pack is essentially a layered structure formed by overlaying several distribution plates on each other in a stack, with each layer being formed by a single plate, such that the features of adjacent plates are aligned to form the channels and through holes that constitute the polymer distribution network. The plates are aligned using a dowel pin which is inserted into a central dowel pin hole 12 located near the center of the plate in the cross direction and toward one edge of the plate in the machine direction, as shown in FIG. 1. The central dowel pin hole 12 is substantially circular and closely matches the cross-sectional shape and dimensions of the central dowel pin, such that the central dowel pin controls the end-to-end alignment of the plates (i.e., the central dowel pin properly aligns the plates in the cross direction) when the dowel pin extends through the stack.

Two additional, substantially slot-shaped dowel pin holes 14 are respectively located near the two cross-directional ends of plate 10 toward one edge of the plate in the machine direction. The slots are aligned in the cross direction, permitting a small degree of play in this direction (i.e., the dowel pins inserted in the outer slot-shaped dowel pin holes do not control the end-to-end alignment in the manner of the central dowel pin). Two corresponding dowel pins are inserted in these outer slot-shaped dowel pin holes 14 and extend through the stack of plates to ensure proper alignment in the machine direction and effectively prevent rotational misalignment between plates. The remaining circular holes shown in FIG. 1 are bolt holes through which bolts are inserted to fasten the plates together to form the fiber extrusion pack.

In spunbond packs over one meter long, there is a limit to design density due to the inherent alignment inaccuracy at the ends of the pack. For example, using certain plate manufacturing processes, any feature on the plate may have a long-term positional accuracy on the order of 0.002 inch per foot from the central dowel pin. With a spin pack constructed from twelve foot long plates, such as that shown in FIG. 1, the ends of the plate are six feet from the central dowel pin. Consequently, a twelve foot long pack would have a plate-to-plate alignment accuracy of approximately 0.012 inches (6 ft.×0.002 inches/ft.). These tolerances significantly limit the density of the pattern design in the distribution plates and thus the spin hole density, since the features on the plates must be large enough to accommodate potential misalignments of this size. While plate-to-plate alignment accuracy can be improved somewhat by reducing manufacturing tolerances, there are inherent limitations to manufacturing accuracies, and greater accuracy requirements generally increase manufacturing costs.

Accordingly, it would be desirable to reduce the plate-to-plate misalignments between adjacent layers of fiber extrusion packs to permit higher pattern design density and smaller features (e.g., holes and channels) in the plates of fiber extrusion packs.

SUMMARY OF THE INVENTION

According to the present invention, a fiber extrusion pack for extruding molten material to form an array of fibers comprises a plurality of split distribution plates arranged in a stack, such that each split distribution plate comprises a layer within the fiber extrusion pack, and features on the split distribution plates form a distribution network that delivers the molten material to orifices in the fiber extrusion pack. Each of the split distribution plates comprises a plurality of plate segments with a gap disposed between adjacent plate segments, and adjacent edges of the plate segments are shaped to form reservoirs along the gap. For example, opposing recesses can be respectively formed in the adjacent edges of the plate segments to form the reservoirs. Sealing plugs are disposed in the reservoirs to prevent leakage of the molten material from the fiber extrusion pack.

The plate segments can include, for example, at least first and second plate segments whose plate-to-plate alignments are independent. This can be accomplished by having the first plate segment include at least one dowel pin hole for receiving a first dowel pin that aligns the first plate segment with corresponding plate segments of other split distribution plates in the fiber extrusion pack, and by having the second plate segment include at least one dowel pin hole for receiving a second dowel pin that aligns the second plate segment with corresponding plate segments of other split distribution plates in the fiber extrusion pack. More specifically, the first plate segment can include a first set of dowel pin holes and the second plate segment can include a second set of dowel pin holes.

Because each plate segment is only a fraction of the length of the overall distribution plate and the plate-to-plate alignment of each plate segment is controlled by the dowel pins of that plate segment, the plate-to-plate alignment (which scales with maximum distance from the dowel pin) is dramatically better for the split distribution plate than for a convention, single-piece distribution plate. The improved plate-to-plate alignment accuracy reduces potential misalignment and allows smaller distribution channel features with a greater distribution feature density.

The sealing plugs can be formed by the molten material that leaks into the gap and collects and solidifies in the reservoirs or by placing a plugging material in the reservoirs at the time of pack assembly. Optionally, the plugging material can be solid when placed in the reservoirs and then melted and hardened to form the sealing plugs upon placing the fiber extrusion pack in a preheater. Alternatively, the plugging material can be injected as a liquid into the reservoirs and then solidifies into the sealing plugs. In one configuration, the reservoirs can lie along angled portions of the gap such that gravity causes the molten plugging material to flow toward and plug exterior openings of the reservoirs.

Optionally, the gaps of adjacent split distribution plates can be non-aligned, such that adjacent split distribution plates have separate reservoirs. According to another option, the reservoirs formed in gaps of adjacent split distribution plates are aligned to form common reservoirs among the adjacent split distribution plates. In this case, the gaps of adjacent split distribution plates can nevertheless be non-aligned between the common reservoirs.

A continuous distribution pattern can be formed on adjacent plate segments, and adjacent edges of the plate segments can be shaped such that the gap extends through the continuous distribution pattern without interrupting the continuous distribution pattern. For example, the adjacent edges of the plate segments can be shaped such that a center portion of the gap has a serpentine shape to allow the center portion of the gap to extend through a continuous pattern of distribution channels.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

The following detailed explanations of FIGS. 2-11 and of the preferred embodiments reveal the methods and apparatus of the present invention. As used herein, the term "spin pack," "fiber extrusion pack," or simply "pack" refers to the assembly for processing the molten polymer to produce extruded polymer streams, including final polymer filtration, distribution systems and the spinneret. As used herein, the term "spinneret" refers to the portion of the spin pack that delivers the molten polymer to and through orifices for extrusion into the environment. The spinneret can be implemented with holes drilled or etched through a plate or any other structure capable of issuing the required fiber streams.

In accordance with the invention, the layers of a fiber extrusion pack comprise split, multi-piece distribution plates instead of continuous, single-piece distribution plates. Each piece or segment of the plate has its own set of dowel pins which controls the plate-to-plate alignment of the segment with segments of adjacent layers. Because each plate segment is only a fraction of the overall length of the spin pack, the plate-to-plate alignment, which increases proportionally with maximum distance to the dowel pin, is dramatically improved without having to increase manufacturing accuracy. This improved plate-to-plate alignment accuracy reduces potential misalignment between plates and permits formation of finer distribution features at a greater density.

For comparison with the conventional distribution plate depicted in FIG. 1, an exemplary split, multi-piece distribution plate 20 comprising six plate segments 22 arranged side-by-side is shown in FIG. 2. Split distribution plate 20 is approximately twelve feet in length, with each of the individual six segments 22 being approximately two feet in length. By arranging several such plates having appropriate polymer distribution features in a stack, a twelve-foot long spin pack can be constructed. The plate-to-plate alignment accuracy is dictated by the maximum distance from the central dowel pin; however, the alignment of each plate segment 22 is controlled by its own central dowel pin. With a comparable manufacturing accuracy on the order of 0.002 inches per foot from the central dowel pin, the plate-to-plate alignment accuracy of each two-foot segment of the plate is then only 0.002 inches (0.002 in/ft×1 ft.), since the furthest distance on each segment from its central dowel pin is one foot. Consequently, with the same manufacturing accuracy, the split, multi-piece distribution plate shown in FIG. 2 has a plate-to-plate alignment accuracy six time greater than the single-piece plate shown in FIG. 1. It will be understood that the configuration shown in FIG. 2 represents only one example, and the invention is not limited to the specific dimensions, manufacturing tolerances, plate-to-plate alignment accuracies, or number of segments in each multi-piece plate described in connection with FIG. 2.

Figure 3:
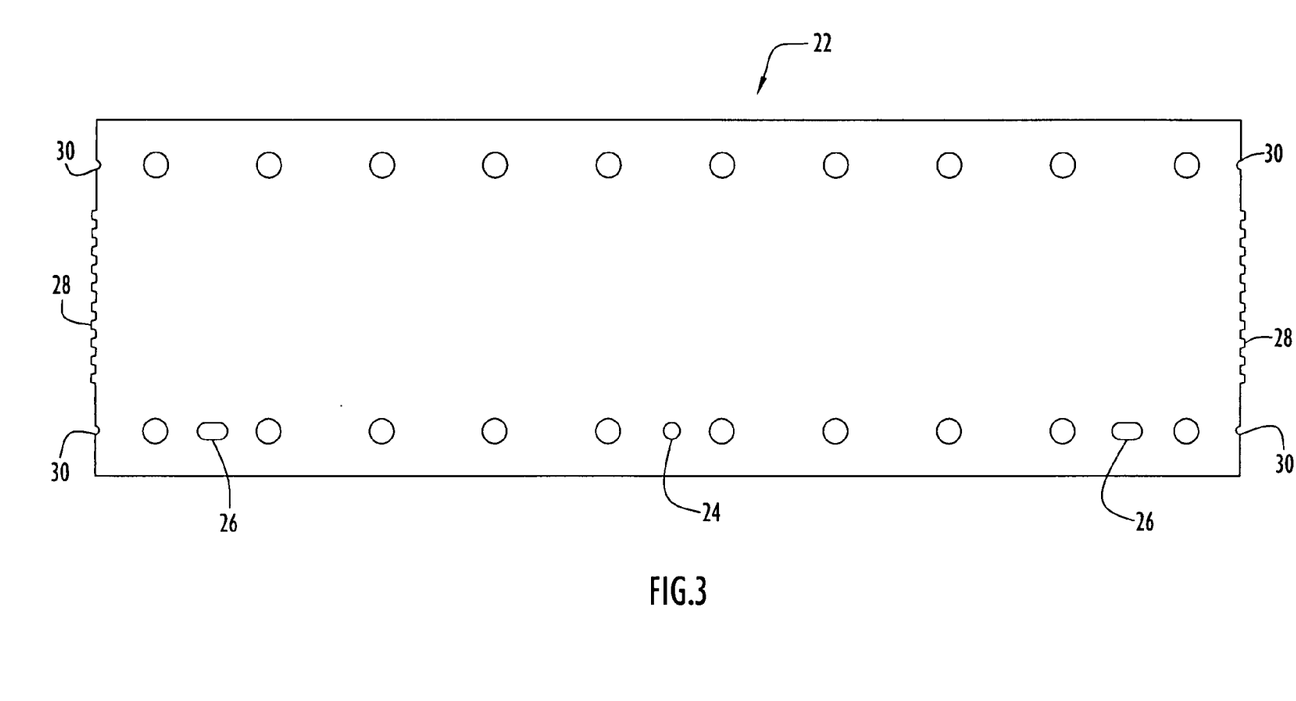
FIG. 3 is an expanded plan view of one segment of the split, multi-piece distribution plate shown in FIG. 2.

FIG. 3 illustrates an expanded view of one of the plate segments 22 of the split distribution plate 20 shown in FIG. 2. As with the previous figures, the etched or machined features that would be present on such a plate to form the polymer distribution network are omitted from the drawing in FIG. 2 for simplicity, and the illustrated dimensions, holes, slots and edge features are not necessarily to scale. Plate segment 22 includes a central dowel pin hole 24 which receives a central dowel pin and is located at approximately the mid-point of the segment in the cross direction and toward one outer edge of the segment in the machine direction. Central dowel pin hole 24 is substantially circular and closely matches the transverse cross-sectional shape and dimensions of the central dowel pin, such that the central dowel pin fits snuggly into the central dowel pin hole 24 and properly aligns the plate segment in the cross direction with corresponding segments of other plates when the dowel pin extends through the stack.

Two additional, substantially slot-shaped dowel pin holes 26 are respectively located near the two cross-directional ends of segment 22 toward one edge of the segment in the machine direction. The slots are aligned in the cross direction, permitting a small degree of play in this direction (i.e., the dowel pins inserted in the outer slot-shaped dowel pin holes do not control the cross-directional alignment in the manner of the central dowel pin). Two corresponding dowel pins are inserted in these outer slot-shaped dowel pin holes 26 and extend through the stack of plates to ensure proper alignment in the machine direction and effectively prevent rotational misalignment between plates. The remaining circular holes shown in FIG. 3 are bolt holes through which bolts are inserted to fasten the plates together to form the pack.

Each of the plate segments 22 in the split, multi-piece distribution plate 20 includes a similar set of dowel pin holes that permit alignment with corresponding segments of other plates in this same manner. While a particular configuration of dowel pin holes has been illustrated in FIGS. 2 and 3, it will be understood that the invention is not limited to any particular positioning, number or arrangement of dowel pin holes, provided the dowel pin holes are configured to cause proper alignment of the plate segments upon insertion of the dowel pins.

At the cross-directional ends of segment 22, the center portion of the end surfaces of the segment have a serpentine profile 28, as shown in FIG. 3. Outside the serpentine center portion of the end surfaces to either side (i.e., toward the machine-direction edges of segment 22), semi-circular recesses 30 are formed in the end surfaces, such that two recesses bound the serpentine center portion of each end surface (i.e., the recesses lie along the end surfaces between the serpentine center portion of the end surfaces and outside edges of the end surfaces). Recesses 30 are aligned with those of adjacent segments of the multi-piece plate to form reservoirs, as described below in greater detail.

Figure 4:
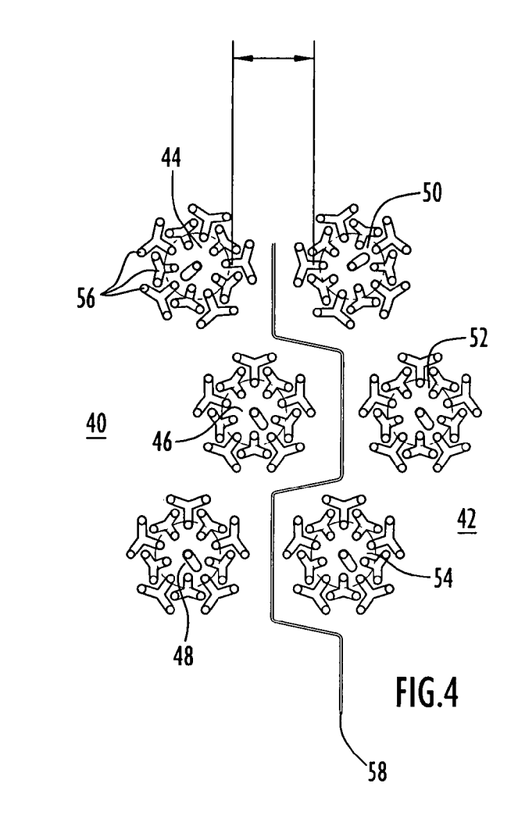
FIG. 4 is an expanded view illustrating the positioning of spinneret holes and supporting polymer distribution channels relative to the gap between adjacent plate segments of a split, multi-piece distribution plate.

The serpentine center portions 28 of the end surfaces of the plate segment permit adjacent segments to be fitted together in a slot-and-tab manner such that the polymer distribution pattern is not interrupted in the machine direction. More specifically, as better shown in the expanded view in FIG. 4, adjacent rows of spin holes are staggered in the cross direction such that individual holes are offset in the cross direction relative to holes in adjacent rows. FIG. 4 shows spin holes 44, 46, 48, 50, 52 and 54 located nearest the ends of two adjacent segments 40 and 42, together with the distribution channels 56 formed in the plates above the spin holes for supplying polymer thereto. In this example, the relatively complex distribution channels could support formation of plural-component fibers having a number of sub-components or sections within each extruded fiber strand. Note that the middle row containing spin holes 46 and 52 is offset relative to the two adjacent rows shown in FIG. 4. Consequently, the gap 58 between plate segments 40 and 42 essentially "snakes" between the spin holes in a serpentine manner. In particular, hole 46 lies at least partially on a tab or projection on the end of plate segment 40 that fits into a slot or recess in plate segment 42 adjacent hole 52.

Likewise, holes 50 and 54 are formed near tabs on plate segment 42 that fit into slots in plate segment 40 near holes 44 and 48, respectively. Importantly the spacing between features across the gap (e.g., the spacing between holes 44 and 50 shown in FIG. 4), is substantially the same as the spacing between features on the individual segments, such that the gap between segments does not disrupt the design pattern on the multi-piece plate. With the foregoing in mind, it will be appreciated that the serpentine profile shown in the various drawings is exaggerated in size to illustrate the serpentine feature. On an actual multi-piece plate, the size of the slots and tabs is much smaller in scale and many more slot and tabs are present, in correspondence with the number and spacing of the distribution channels in the plate.

Figure 5:
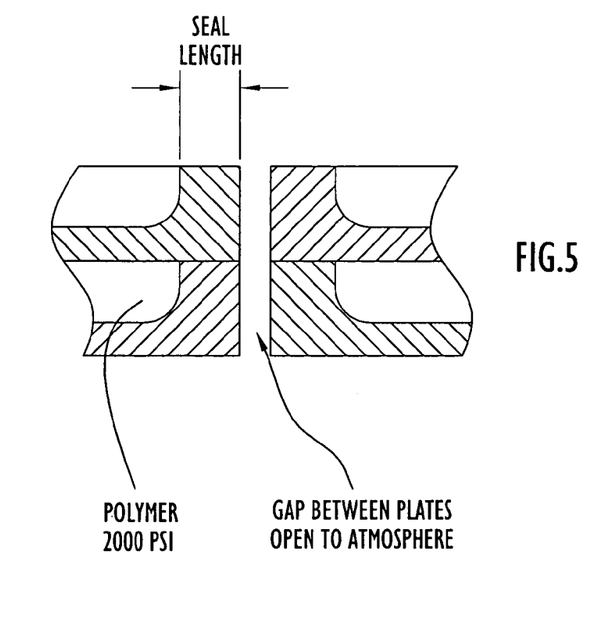
FIG. 5 is a cross-sectional side view of two adjacent split, multi-piece distribution plates in a spin pack, illustrating the sealing width between channels carrying pressurized polymer and the gap between adjacent segments of the multi-piece plates.

One difficulty with forming plates with multiple segments is that the highly pressurized polymer will inevitably leak into the narrow gaps or "splits" between adjacent plate segments. In a typical spunbond pack, the spin hole to spin hole spacing is on the order of 6 millimeters. Depending on the type of fibers being extruded (e.g., bi-component), fairly complicated distribution features must lie above each spin hole. As described previously, if the plate is split into segments, the splits must lie between spin holes without disturbing the pattern of spin holes to obtain a continuous extruded curtain of fiber strands. The gap width can be on the order of 0.005 inch. As shown in FIG. 5, this arrangement results in a very narrow metal-to-metal seal length between the gap between plate segments (which is at atmospheric pressure) and the high pressure polymer passages (e.g., at 2000 psi) near the edges of the plate segments. This seal length can be on the order of only 0.01 to 0.02 inch, or approximately 0.5 millimeter. Typically, the length of the metal-to-metal seal between plates required to prevent polymer leakage is much greater; consequently, this narrow seal length caused by the presence of the gap is likely to leak unacceptably for most long pack fiber processes, such that polymer will leak into the gap and work its way to the outside of the pack.

Figure 6:
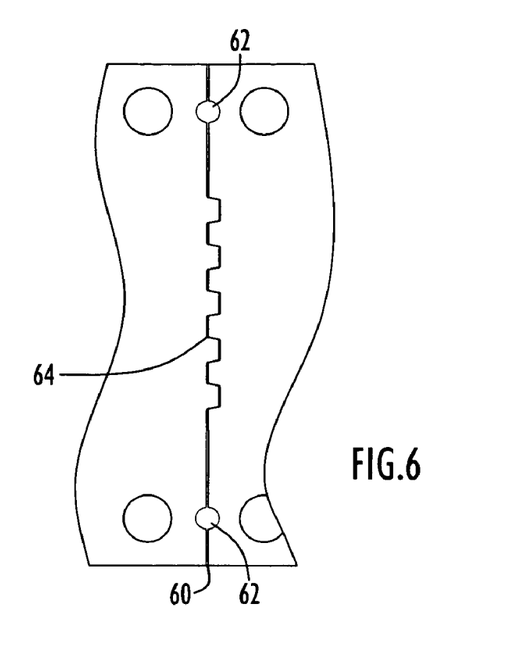
FIG. 6 is a plan view illustrating one configuration of the gap between adjacent plate segments of a split, multi-piece distribution plate, wherein reservoirs for blocking polymer flow are positioned along the gap.

In accordance with another aspect of the present invention, an innovative technique is used to seal the gap between the plate segments and prevent leakage of polymer from the spin pack. As shown in FIG. 6, the profiles of the cross-directional ends of the plate segments are shaped such that the gap 60 between the segments includes reservoirs 62 along the gap, which are positioned toward the ends of the gap (in the machine direction) and bound the gap's serpentine-shaped center portion 64 into which polymer leaks due to the small seal length. The reservoirs can be substantially circular and can have a diameter of approximately 6 millimeters, although the invention is not limited to having reservoirs of any particular shape or dimensions.

A sealing plug is deposited into each reservoir 62 to block the polymer in the center portion 64 of the gap 60 from seeping to the outer ends of the gap, which terminate on the exterior side surfaces of the pack. The sealing plug can be formed in a variety of ways. One option is to allow weeping polymer that enters the central portion of the gap to collect in the reservoirs and degrade into a solid plugs, thereby sealing the gap before enough polymer leaks to pressurize the gap and cause a leak. Another option is to place a plugging material in the reservoirs at pack assembly to seal the gap. According to another option, the plugging material can be injected after final pack assembly. According to yet another option, the sealing material can be a solid polymer at assembly, but is then subsequently melted in a preheater oven to flow into the reservoirs and reservoir openings, and degrade into hard plugs while the pack is in the preheater (i.e., prior to operation). These and other options will be described in greater detail in conjunction with FIGS. 7-11.

Polymer fiber extrusion packs used in manufacturing are periodically taken off line for cleaning (e.g., every two to three weeks). The cleaning process involves disassembling the pack by removing the dowel pins and bolts and prying apart the distribution plates, cleaning the plates, and reassembling the pack with the cleaned plates. Each time the pack is assembled in this manner, the plugging material is reintroduced into the reservoirs.

The sealing material can be a solid material that is placed in the reservoir at the time of assembly. The spin pack is typically placed in a preheater oven for preheating prior to installation in the spunbond machine. As the solid sealing material melts in the preheater, it expands and preferably completely fills the reservoir and oozes into the openings of the reservoir that lead to the serpentine center portion of the gap and to the outer end of the gap at the pack exterior, thereby sealing the reservoir from ingress of polymer from the serpentine central portion of the gap or egress of any polymer from the reservoir to the pack exterior (in the event that the interior opening of the reservoir is not entirely blocked by the sealing material).

The sealing material can be, for example, a solid polymer, such as nylon 66 (polyamide-66 or PA-66), which will initially melt and expand at the preheat temperature, but if heated for about an hour, will then crystallize and solidify, thereby degrading into a hard sealing plug in the reservoir and reservoir openings. The solidified sealing plug will not subsequently re-melt when heat is applied again during the extrusion process. In addition to nylon 66, other sealing materials that can be used include, but are not limited to, EVOH (ethylene vinyl alcohol) and PVA (polyvinyl alcohol).

Figure 7:
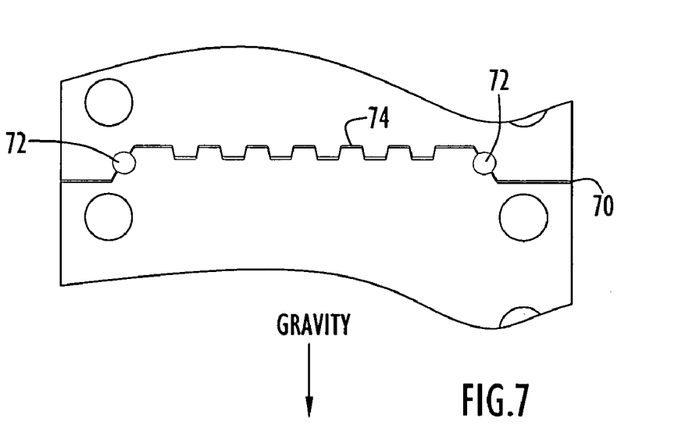
FIG. 7 is a is a plan view illustrating another configuration of the gap between adjacent plate segments of a split, multi-piece distribution plate, wherein the gap is shaped such that gravity causes plugging material to block the path from the reservoirs toward the exterior edges of the plate during a preheating process.

Referring to FIG. 7, in accordance with one embodiment where a solid sealing material is placed in the reservoirs and then melted and hardened into a solid plug in the preheating process, the shape of the gap can be configured such that gravity can assist in ensuring that the openings of the reservoirs to the exterior side of the extrusion pack are fully blocked by the sealing plugs. Specifically, the serpentine center portion 74 of the gap 70 between adjacent segments of the distribution plate is formed in the manner previously described, lying substantially along an axis in the machine direction. However, on both sides of the serpentine center portion 74, the gap 70 angles off diagonally, and the reservoirs 72 lie along the angled portions of the gap. To the exterior of reservoirs 72, the angle of the gap again changes, such that the end portions of the gap adjacent to the exterior of the pack lie parallel with the machine direction. In this configuration, when the spin pack is placed in the preheater on its side, with the serpentine center portion 74 of gap 70 lying above reservoirs 72, as the solid plugging material in reservoirs 72 melts, gravity forces the plugging material towards the exterior openings of the reservoirs, ensuring that the plugging material oozes into and blocks the exterior openings of the reservoirs (the plugging material is too viscous to flow through the gap to the pack exterior). In this manner, even if the sealing plug does not completely fill the reservoirs, the exterior openings will nevertheless be blocked and any pressure exerted by polymer seeping into the gap will not dislodge the sealing plug.

The invention is not limited to the use of solid sealing materials that are melted and hardened during the preheating processes. The sealing material can optionally be a liquid caulking that is injected into and fills the reservoirs and then hardens to seal the gap. Further, as previously described, the fiber extrusion pack can be assembled without any sealing material in the reservoirs. In this case, the polymer being extruded during operation of the spunbond machine is relied upon to form solid plugs in the reservoirs. Specifically, the size and shape of the reservoirs are such that the gradual rate at which polymer weeps into the gap and flows into the reservoirs permits the polymer to thicken and degrade into a solid plug as the polymer collects in the reservoirs. Once the solid plug develops, it blocks the flow of further polymer into the reservoirs, thereby preventing polymer from leaking to the exterior of the spin pack.

Figure 8:
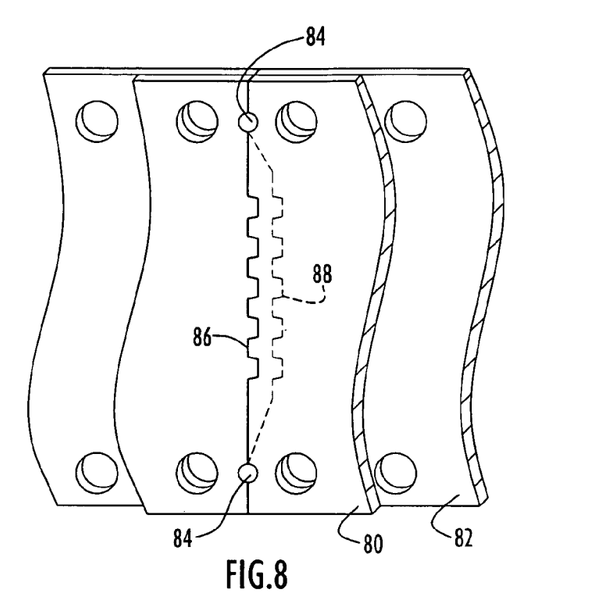
FIG. 8 is a plan view in perspective of two adjacent split, multi-piece distribution plates in a spin pack, wherein, between the reservoirs, the gap between adjacent plate segments of the first plate is displaced is the cross direction relative to the corresponding gap between adjacent plate segments of the second plate, such that the portions of the gaps containing polymer are non-aligned in adjacent layers.

In accordance with another aspect of the invention, the positions of the gaps on adjacent split distribution plates are arranged such that the gaps are non-aligned with gaps of adjacent plates. FIG. 8 illustrates two adjacent split, multi-piece distribution plates 80 and 82 in a spin pack, wherein, between the reservoirs 84, the gap 86 between adjacent plate segments of plate 82 is displaced is the cross direction relative to the corresponding gap 88 between adjacent plate segments of plate 82, such that the central portions of the gaps are non-aligned in adjacent layers. Specifically, the serpentine center portions of the gaps, where polymer is expected to leak, lie substantially parallel to the machine direction but are offset from each other in the cross direction. If the gaps of several plates are all aligned, a single larger gap is formed, from which polymer can more easily leak. In the configuration shown in FIG. 8, because sequential distribution plates have non-aligned gaps, the multi-layer pack has many small, independent gaps instead of one larger gap that extends through multiple layers (plates). This arrangement further reduces the likelihood of polymer leakage. Even if considerable leakage occurs on one level, the polymer must still force its way through several small gaps, creating a more difficult path for the polymer to leak to the outside of the pack.

Optionally, the separate gaps can be connected to common reservoirs formed by the aligned reservoirs of several plates, as shown in FIG. 8. Specifically, outside of the center serpentine portion of the gap, each of the gaps is appropriately angle such that the gaps come to common points at the reservoirs 84. This arrangement is advantageous when the sealing material is inserted into the reservoirs at assembly, since the sealing material can easily be fitted into the two common reservoirs for each set of gaps in the plates.

Figure 9:
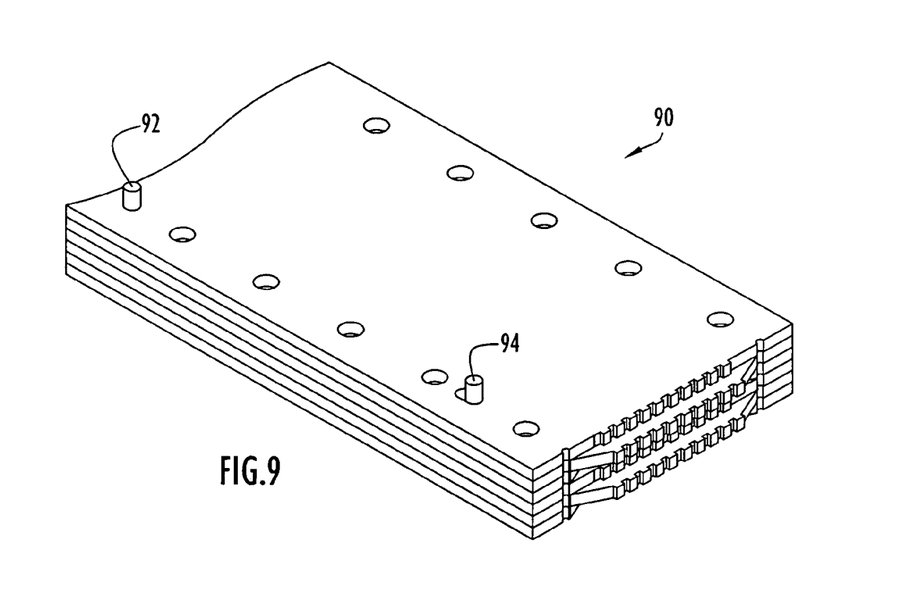
FIG. 9 is a partial perspective view of a fiber extrusion spin pack employing the gap arrangement shown in FIG. 8.

FIG. 9 is a perspective view of a stack of split plates in a fiber extrusion pack 90 with the edges of a set of corresponding plate segments exposed to illustrate the effect of the gap arrangement shown in FIG. 8. Note that the segments are aligned by central dowel pin 92 and outer dowel pin 94. The segment of the top distribution plate shown has a gap in which the serpentine center portion of the gap lies along an axis that forms a line between the reservoirs. The plate segment below the segment of the top distribution plate has a serpentine center portion of the gap that is offset to one side of the top layer gap in the cross direction, while the next plate segment down in the stack has a serpentine center portion of the gap that is offset to the other side of the top layer gap in the cross direction. The remain three layers shown repeat this offset pattern (i.e., center, one side, other side). The arrangement shown in FIG. 9 is merely illustrative, and the number of plate layers, offset configurations, and layer-to-layer pattern are not limited to the particular example shown in FIG. 9.

Figure 10:
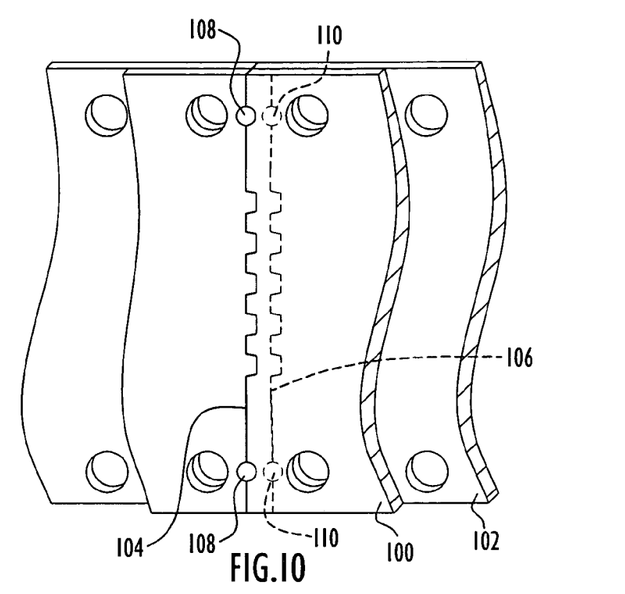
FIG. 10 is a plan view in perspective of two adjacent split, multi-piece distribution plates in a spin pack, wherein the gap and reservoirs between adjacent plate segments of the first plate are displaced in the cross direction relative to the gap and reservoirs between adjacent plate segments of the second plate, such that the gaps and reservoirs are not aligned in adjacent layers.

FIG. 10 illustrates another embodiment in which gaps of adjacent plates are offset in the cross direction to minimize the likelihood of polymer leakage. Two adjacent split, multi-piece distribution plates 100 and 102 with respective gaps 104 and 106 are shown, wherein the gaps are offset from each other in the cross direction, such that the gaps are non-aligned in adjacent layers. In this case, each gap lies along a separate, parallel axis along the entire length of the gap such that, not only are the serpentine center portions of the gaps non-aligned, but the reservoirs 108 of plate 100 are non-aligned and independent of the reservoirs 110 of plate 102. As with the example shown in FIG. 8, since sequential distribution plates have non-aligned gaps, the multi-layer pack has many small, independent gaps instead of one larger gap that extends through multiple layers. However, in the example shown in FIG. 10, each successive plate in the pack also has its own separate reservoirs, independent of those of adjacent plates. This arrangement is less conducive to placing a sealing material in the reservoirs at assembly, but is suitable where the sealing plugs are formed by polymer weeping into the reservoirs during operation of the spunbond machine.

Figure 11:
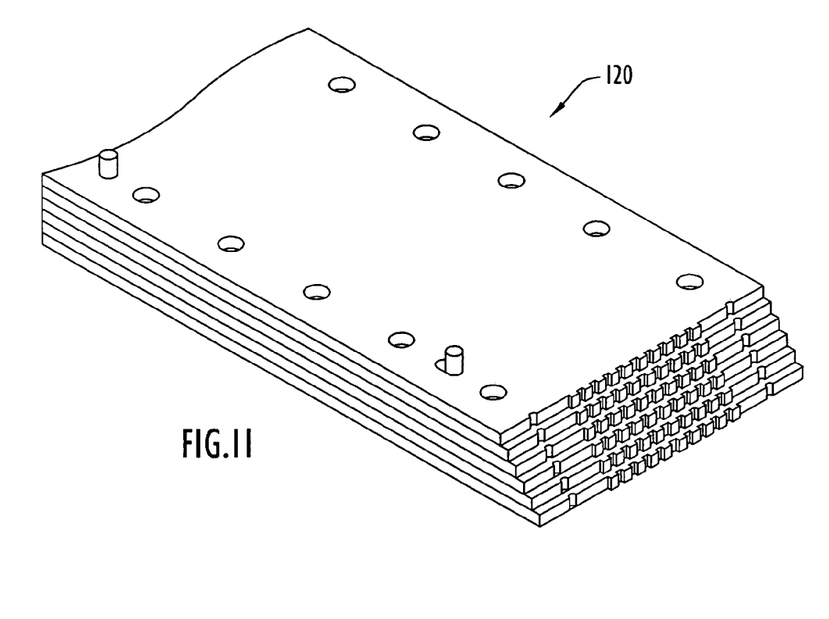
FIG. 11 is a partial perspective view of a fiber extrusion spin pack employing the gap arrangement shown in FIG. 10.

FIG. 11 illustrates the effect of the configuration shown in FIG. 10 in a fiber extrusion pack 120 including a stack of split plates with gaps of successive layers offset from adjacent layers in the cross direction. The arrangement shown in FIG. 11 is merely illustrative, and the number of plate layers, offset configurations, and layer-to-layer pattern are not limited to the particular example shown in FIG. 11.

While described principally in the context of a spunbond machine and fabrication process, it will be understood that the present invention in not limited to spunbond systems and is applicable to any equipment and processes in which a molten material is distributed through distribution channels under high pressure and extruded, including, for example, melt blown systems. Moreover, the invention is not limited to production of polymer fibers of any particular configuration and is applicable to fibers having any of a variety of shapes and cross-sectional configurations. Further, while the invention is most useful where most or all of the distribution plates within the fiber extrusion pack are split, multi-piece plates comprising plural segments, the invention is not strictly limited to fiber extrusion packs in which most or all of the distribution plates are split plates, and combinations of split and non-split plates may be suitable in certain instances.

Having described preferred embodiments of new and improved fiber extrusion pack including split distribution plates, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A fiber extrusion pack for extruding molten material to form an array of fibers, comprising:
   a plurality of split distribution plates arranged in a stack such that each split distribution plate comprises a layer within the fiber extrusion pack, and features on the split distribution plates form a distribution network that delivers the molten material to orifices in the fiber extrusion pack;
   wherein each of the split distribution plates comprises a plurality of plate segments with a gap disposed between adjacent plate segments that facilitates movement of the adjacent plate segments toward or away from each other.

2. The fiber extrusion pack of claim 1, wherein adjacent edges of the plate segments are shaped to form reservoirs along the gap.

3. The fiber extrusion pack of claim 2, wherein opposing recesses are respectively formed in the adjacent edges of the plate segments to form the reservoirs.

4. The fiber extrusion pack of claim 2, further comprising sealing plugs disposed in the reservoirs to prevent leakage of the molten material from the fiber extrusion pack.

5. The fiber extrusion pack of claim 4, wherein the sealing plugs are formed by the molten material that leaks into the gap and collects and solidifies in the reservoirs.

6. The fiber extrusion pack of claim 4, wherein the sealing plugs are formed by placing a plugging material in the reservoirs at pack assembly.

7. The fiber extrusion pack of claim 6, wherein the plugging material is solid when placed in the reservoirs and is melted and hardened into the sealing plugs upon placing the fiber extrusion pack in a preheater.

8. The fiber extrusion pack of claim 6, wherein the plugging material is injected as a liquid into the reservoirs and solidifies into the sealing plugs.

9. The fiber extrusion pack of claim 4, wherein the sealing plugs are formed by molten plugging material that solidifies, and wherein the reservoirs lie along angled portions of the gap such that gravity causes the molten plugging material to flow toward and plug exterior openings of the reservoirs.

10. The fiber extrusion pack of claim 2, wherein gaps of adjacent split distribution plates are non-aligned, such that adjacent split distribution plates have separate reservoirs.

11. The fiber extrusion pack of claim 2, wherein reservoirs formed in gaps of adjacent split distribution plates are aligned to form common reservoirs among the adjacent split distribution plates.

12. The fiber extrusion pack of claim 11, wherein the gaps of adjacent split distribution plates are non-aligned between the common reservoirs.

13. The fiber extrusion pack of claim 11, wherein a sealing material is inserted into the common reservoirs upon assembly of the fiber extrusion pack.

14. The fiber extrusion pack of claim 11, wherein a fluid sealing material is injected into the common reservoirs upon assembly of the fiber extrusion pack.

15. The fiber extrusion pack of claim 1, wherein gaps of adjacent split distribution plates are non-aligned.

16. The fiber extrusion pack of claim 1, wherein the plate segments include at least first and second plate segments, the first plate segment including at least one dowel pin hole for receiving a first dowel pin that aligns the first plate segment with corresponding plate segments of other split distribution plates in the fiber extrusion pack, the second plate segment including at least one dowel pin hole for receiving a second dowel pin that aligns the second plate segment with corresponding plate segments of other split distribution plates in the fiber extrusion pack.

17. The fiber extrusion pack of claim 16, wherein the first plate segment includes a first set of dowel pin holes and the second plate segment includes a second set of dowel pin holes.

18. The fiber extrusion pack of claim 1, wherein the plate segments include at least first and second plate segments, and wherein a plate-to-plate alignment of the first plate segment is independent of the plate-to-plate alignment of the second plate segment.

19. The fiber extrusion pack of claim 1, wherein adjacent edges of the plate segments are shaped such that a center portion of the gap has a serpentine shape.

20. The fiber extrusion pack of claim 19, wherein the serpentine-shaped center portion of the gap extends through a pattern of distribution channels formed on the adjacent plate segments.

21. The fiber extrusion pack of claim 1, wherein a continuous distribution pattern is formed on adjacent plate segments, and wherein adjacent edges of the adjacent plate segments are shaped such that the gap extends through the continuous distribution pattern without interrupting the continuous distribution pattern.

22. The fiber extrusion pack of claim 1, wherein each gap between adjacent plate segments extends continuously across the distribution plate such that adjacent plate segments of each distribution plate are separable from each other at the gap defined between the adjacent plate segments.

23. The fiber extrusion pack of claim 1, wherein the gaps defined between separable and adjacent plate segments of the split distribution plates are oriented in a direction transverse a longitudinal direction of each split distribution plate.

24. The fiber extrusion pack of claim 1, wherein each gap defined between separable and adjacent plate segments of a split distribution plate extends from one side of the plate to an opposing side of the plate.

25. A split distribution plate for use in a fiber extrusion pack, comprising:
a plurality of plate segments arranged side-by-side, the plate segments including features that form a distribution network with features of adjacent distribution plates, the plurality of plate segments comprising at least first and second plate segments whose adjacent edges form a gap in the split distribution plate so as to permit movement of the first and second plate segments toward and away from each other.

26. The split distribution plate of claim 25, wherein the adjacent edges of the first and second plate segments are shaped to form reservoirs along the gap.

27. The split distribution plate of claim 26, wherein opposing recesses are respectively formed in the adjacent edges of the first and second plate segments to form the reservoirs.

28. The split distribution plate of claim 26, wherein sealing plugs are disposed in the reservoirs to prevent leakage of molten material from the fiber extrusion pack.

29. The split distribution plate of claim 25, wherein the first plate segment includes at least one dowel pin hole for receiving a first dowel pin that aligns the first plate segment with corresponding plate segments of other distribution plates in the fiber extrusion pack, and the second plate segment includes at least one dowel pin hole for receiving a second dowel pin that aligns the second plate segment with corresponding plate segments of other distribution plates in the fiber extrusion pack.

30. The split distribution plate of claim 29, wherein the first plate segment includes a first set of dowel pin holes and the second plate segment includes a second set of dowel pin holes.

31. The split distribution plate of claim 25, wherein a plate-to-plate alignment of the first plate segment is independent of the plate-to-plate alignment of the second plate segment.

32. The split distribution plate of claim 25, wherein the adjacent edges of the first and second plate segments are shaped such that a center portion of the gap has a serpentine shape.

33. The split distribution plate of claim 32, wherein the serpentine-shaped center portion of the gap extends through a pattern of distribution channels formed on the first and second plate segments.

34. The split distribution plate of claim 25, wherein a continuous distribution pattern is formed on the first and second plate segments, and wherein the adjacent edges of the first and second plate segments are shaped such that the gap extends through the continuous distribution pattern without interrupting the continuous distribution pattern.

35. A fiber extrusion pack for extruding molten material to form an array of fibers comprising the distribution plate of claim 25.

36. A spunbond apparatus for generating an array of synthetic polymer fibers, comprising a spin beam, wherein the spin beam comprises a spin pack and at least one metering pump for delivering molten polymer to the spin pack, and wherein the spin pack includes at least one distribution plate according to claim 25.

37. The split distribution plate of claim 25, wherein the gap between the first and second plate segments extends continuously across the distribution plate such that the first and second plate segments are separable from each other at the gap.

38. The split distribution plate of claim 25, wherein the gap defined between the adjacent edges of the first and second plate segments is oriented in a direction transverse a longitudinal direction of the split distribution plate.

39. The split distribution plate of claim 25, wherein the gap defined between the adjacent edges of the first and second plate segments extends from one side of the plate to an opposing side of the plate.

\* \* \* \* \*